United States Patent
Danielsson et al.

(10) Patent No.: US 10,126,437 B1
(45) Date of Patent: Nov. 13, 2018

(54) DETECTOR FOR X-RAY IMAGING

(71) Applicant: Prismatic Sensors AB, Stockholm (SE)

(72) Inventors: Mats Danielsson, Taby (SE); Staffan Karlsson, Bromma (SE); Torbjorn Hjarn, Vaxholm (SE); Cheng Xu, Taby (SE)

(73) Assignee: PRISMATIC SENSORS AB, Stockholm (SE)

( * ) Notice: Subject to any disclaimer, the term of this patent is extended or adjusted under 35 U.S.C. 154(b) by 0 days.

(21) Appl. No.: 15/595,087

(22) Filed: May 15, 2017

(51) Int. Cl.
*G01T 1/24* (2006.01)

(52) U.S. Cl.
CPC .................... *G01T 1/241* (2013.01)

(58) Field of Classification Search
CPC .... G01T 1/24; G01T 1/17; G01T 1/36; H01L 31/11; G01J 5/20
See application file for complete search history.

(56) References Cited

U.S. PATENT DOCUMENTS

| | | | |
|---|---|---|---|
| 2009/0134334 A1* | 5/2009 | Nelson | G01T 1/2002 250/361 R |
| 2010/0204942 A1* | 8/2010 | Danielsson | G01T 1/242 702/85 |
| 2013/0048868 A1* | 2/2013 | Cok | H01L 27/14612 250/370.08 |
| 2013/0249030 A1* | 9/2013 | Takahashi | H01L 31/118 257/429 |
| 2017/0055923 A1* | 3/2017 | Meylan | A61B 6/482 |

OTHER PUBLICATIONS

R. Nowotny, Application of Si-microstrip-detectors in medicine and structural analysis, Nuclear Instruments and Methods in Physics Research, 1984, pp. 34-39, vol. 226, Elsevier Science Publishers B.V., North-Holland, Amsterdam.
Shoichi Yoshida, et al., Application of silicon strip detectors to X-ray computed tomography, Nuclear Instruments and Methods in Physics Research, 2005, pp. 412-420, vol. 541, Elsevier B.V.

(Continued)

*Primary Examiner* — David Porta
*Assistant Examiner* — Mamadou Faye
(74) *Attorney, Agent, or Firm* — Young & Thompson

(57) ABSTRACT

Disclosed is an edge-on photon counting detector and a method for manufacturing a charge collecting side of such detector. The edge-on photon counting detector includes a semi-conducting substrate. The semi-conducting substrate includes, a first end adapted to face an x-ray source and a second end opposite the first end in the direction of incoming x-rays, and at least one strip having N depth segments, N≥2, each of the depth segments including a charge collecting metal electrode and a charge collecting side including doped regions and insulating regions, wherein each of the charge collecting metal electrodes is arranged over a corresponding doped region and is connected to a respective routing trace arranged on the insulating regions, the respective routing trace being adapted to conduct signals from the charge collecting metal electrode to a read-out pad E, connectable to front-end electronics, arranged at the second end.

21 Claims, 18 Drawing Sheets

(56) References Cited

OTHER PUBLICATIONS

Cheng Xu, et al., Energy resolution of a segmented silicon strip detector for photon-counting spectral CT, Nuclear Instruments and Methods in Physics Research, 2013, pp. 11-17, vol. 713, Elsevier B.V.

Xuejin Liu, et al., Spectral response model for a multibin photon-counting spectral computed tomography detector and its applications, Journal of Medical Imaging, 2015, vol. 2, Issue 3.

E. Belau, et al., Charge collection in silicon strip detectors, Nuclear Instruments and Methods, 1983, pp. 253-260, vol. 214, North-Holland Publishing Company.

\* cited by examiner

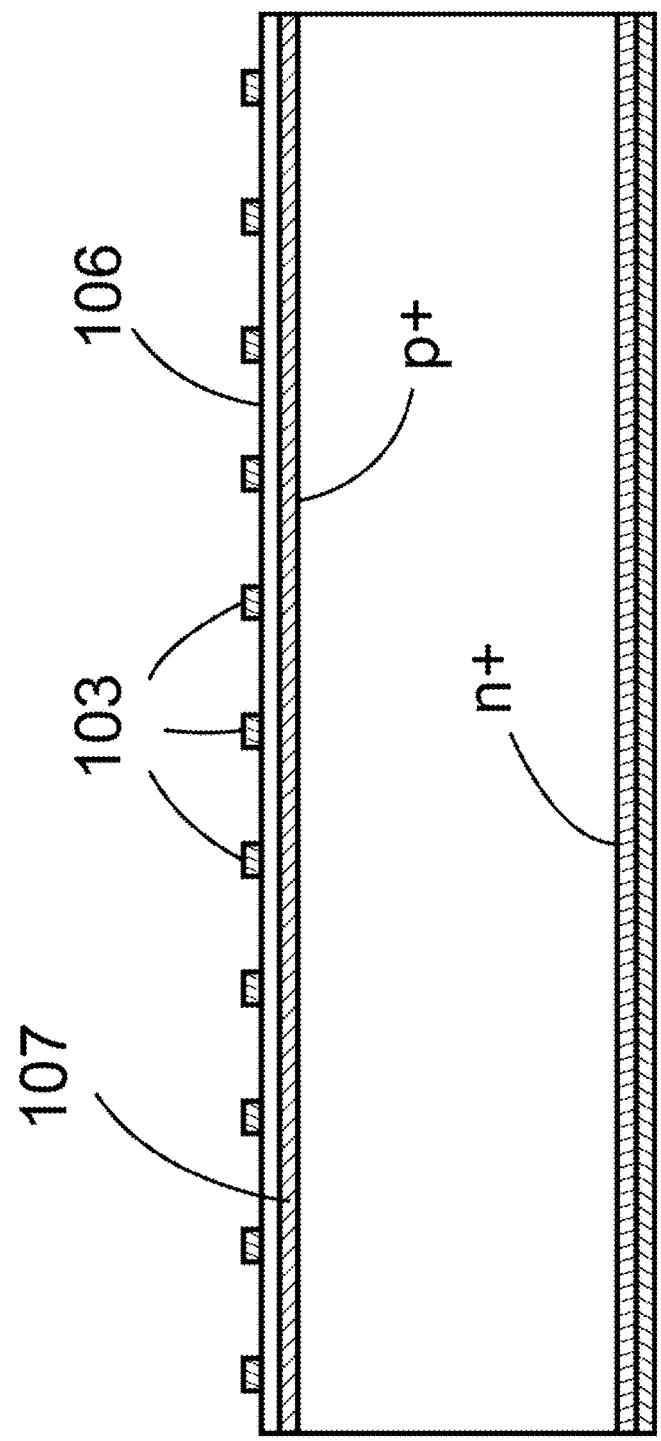

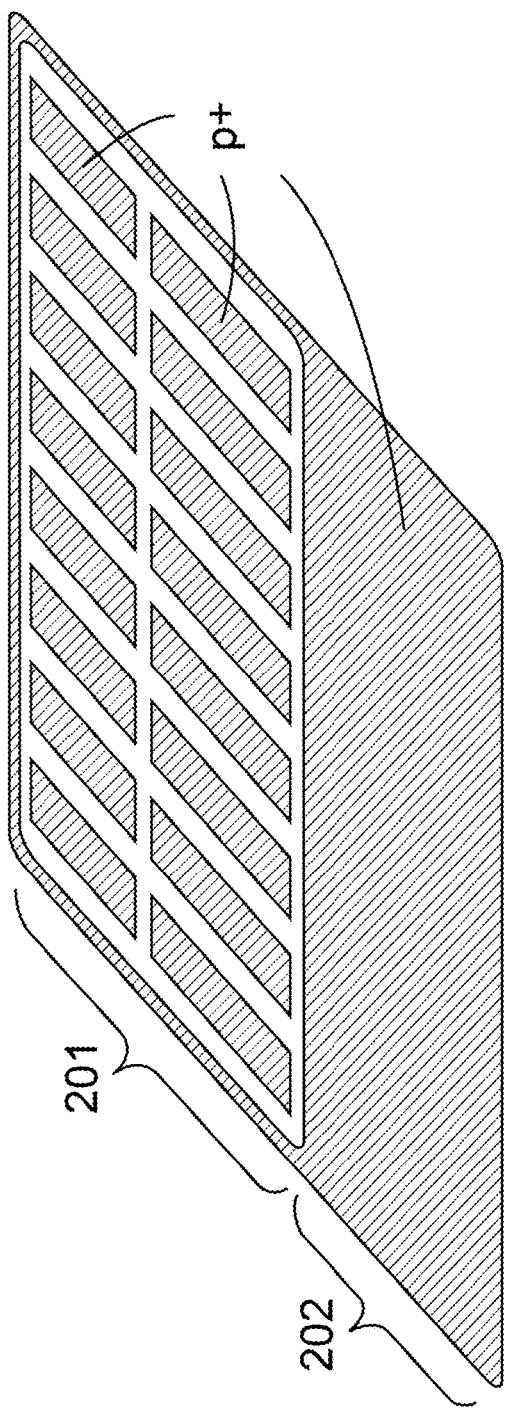

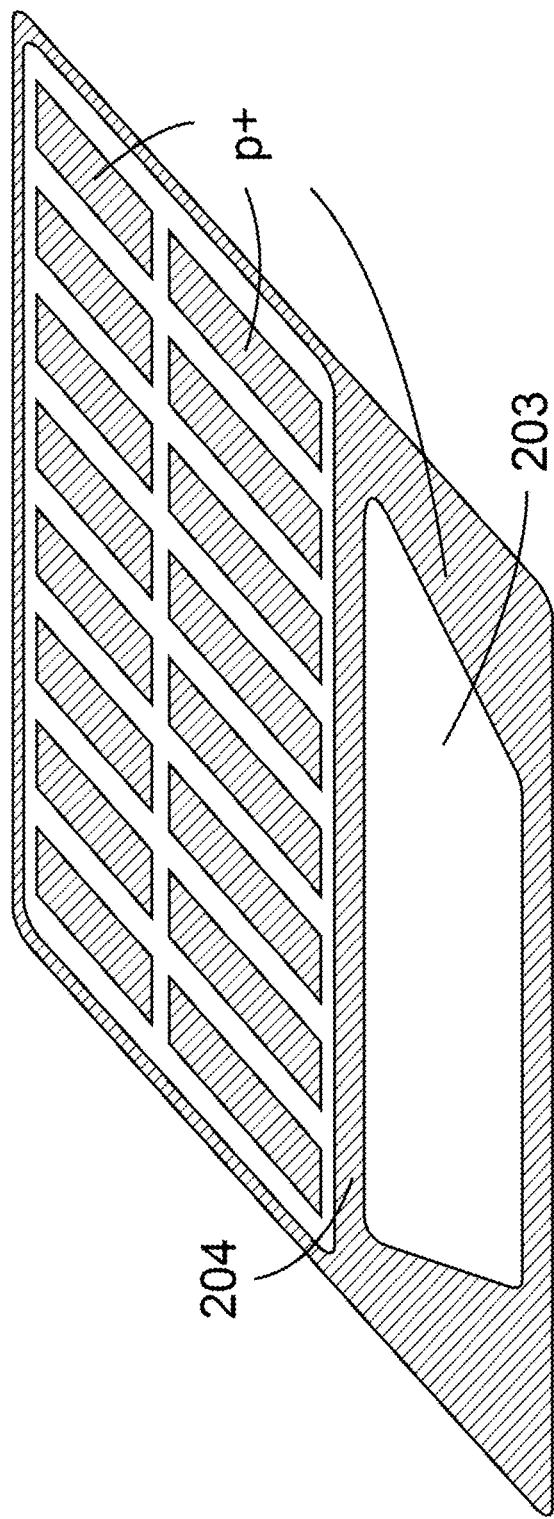

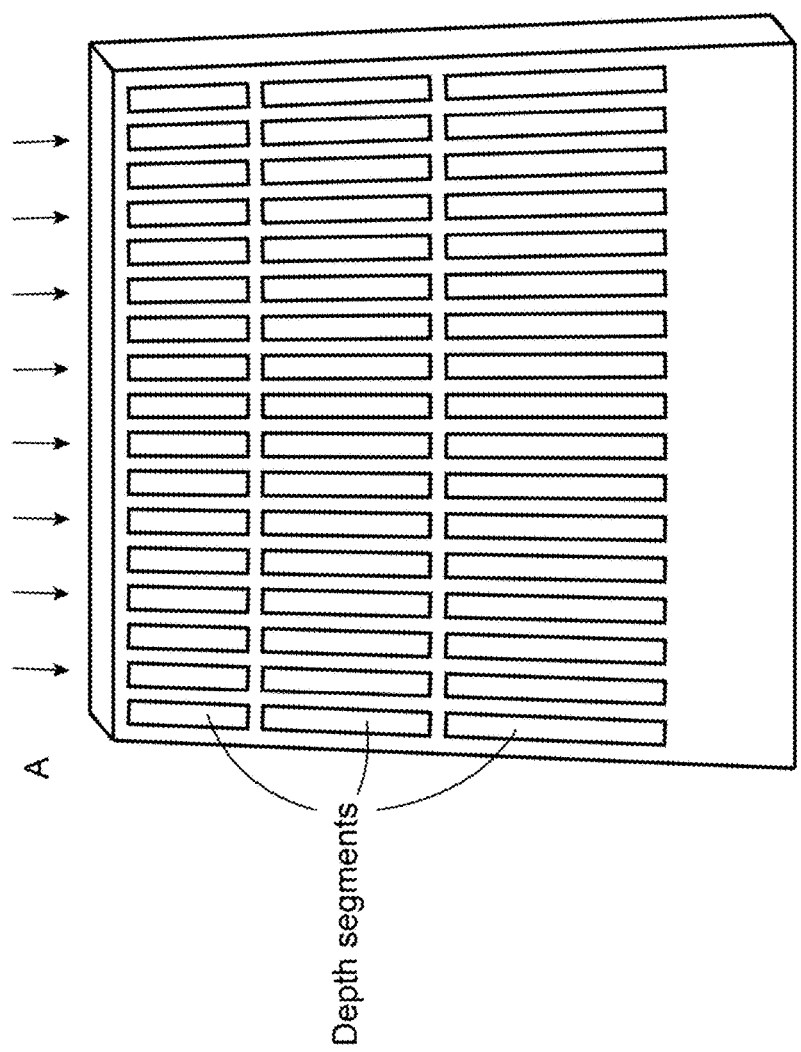

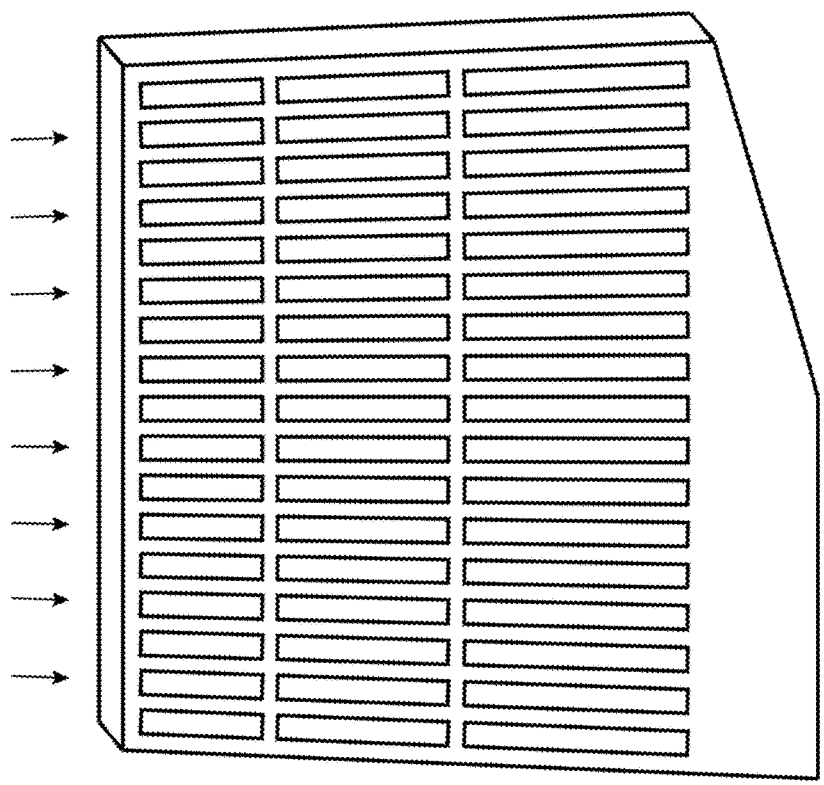

DETECTOR FOR X-RAY IMAGING

TECHNICAL FIELD

The present invention relates generally to detectors for x-ray imaging and more particularly to semi-conducting strip detectors for photon-counting x-ray imaging as well as methods for manufacturing the detectors.

BACKGROUND

Semi-conducting detectors, such as silicon detectors, are widely used in x-ray imaging to detect x-ray photons and convert them into digital signals or digital images by collecting charge carriers released by each interacting photon. For low-energy x-rays, semi-conducting detectors are commonly made to be pixelated, by orienting detector surface towards x-rays and dividing the detector plane into a number of pixels. Each pixel collects charges generated by x-ray interactions within the pixel through an applied electric field and feed the charges to corresponding front-end electronics. However, due to low atomic number and low density, for imaging with high-energy x-rays, such as x-ray computed tomography, the pixelated configuration of e.g. a silicon detector is not capable of capturing all high-energy x-rays with a substrate thickness less than half millimeter, resulting in low detection efficiency. The low atomic number of silicon also means that the fraction of Compton scattered x-ray photons in the detector dominates over the photo absorbed photons which creates problem because the scattered photons may induce signals in other pixels in the detector which will be equivalent to noise in those pixels.

One way to overcome the problem of low absorption efficiency for silicon is to employ edge-on configuration of the detector by orienting the edge of a silicon detector towards incident x-rays so that the depth of silicon can be significantly increased. The first mentioning of crystalline silicon strip detectors in edge-on geometry as an x-ray detector is R. Nowotny: "Application of Si-microstrip-detectors in medicine and structural analysis" Nuclear Instruments and Methods in Physics Research 226 (1984) 34-39. It concludes that silicon will work at low energies such as for breast imaging but not for higher energies such as computed tomography mainly because of the higher fraction of Compton scattering and problems related to this.

The edge-on geometry for semiconductor detectors is also suggested in U.S. Pat. No. 4,937,453 Robert Nelson "X-ray detector for radiographic imaging", U.S. Pat. No. 5,434,417 David Nygren "High resolution energy-sensitive digital X-ray" and U.S. Pat. No. 7,291,841 B2 Robert Nelson et al. "Device and system for enhanced SPECT, PET, and Compton scatter imaging in nuclear medicine". In U.S. Pat. No. 5,434,417, the concept of a segmented silicon strip detector is described, but how the charge collecting electrodes are connected to the front-end electronics and the arrangement of routing traces are not presented. In U.S. Pat. No. 7,291,841 B2 edge-on detectors are used for so called Compton imaging which does not relate to the present invention. In a paper by Shoichi Yoshida, Takashi Ohsugi "Application of silicon strip detectors to X-ray computed tomography" Nuclear Instruments and Methods in Physics Research A 541 (2005) 412-420 an implementation of the edge-on concept is outlined. In this implementation thin tungsten plates placed between edge-on silicon strip detector reduces the background of scattered X-rays and improve the image contrast with low dose.

The implementation of edge-on silicon strip detectors is further described in U.S. Pat. No. 8,183,535 B2 Mats Danielsson et al. "Silicon detector assembly for x-ray imaging", Cheng Xu et al.: "Energy resolution of a segmented silicon strip detector for photon-counting spectral CT" Nuclear Instruments and Methods in Physics Research 715 (2013)11-17 and Xuejin Liu et al.: "Spectral response model for a multibin photon-counting spectral computed tomography detector and its applications" Journal of Medical Imaging 2(3) (2015) 033502. And as described each strip is further divided into depth segments to mitigate the load of front-end electronics under high flux applications of x-ray imaging, such as x-ray computed tomography. The photon-converted signals detected in each depth segment are conducted to an individual processing channel of the front-end electronics via a routing trace which connects the corresponding charge collecting electrode of the depth segment and the input of a channel in front-end electronics. Described by Cheng Xu et al.: "Energy resolution of a segmented silicon strip detector for photon-counting spectral CT" Nuclear Instruments and Methods in Physics Research 715(2013)11-17, two different metal layers are implemented on the charge collecting side of silicon substrate with one metal layer for charge collecting electrodes and the other layer for routing traces. In Swedish Patent Application No. 9801677-7, Mats Danielsson, a silicon detector with routing traces running in between charge collecting electrodes for monitoring of radiation therapy is described. E. BELAU et al. "Charge collection in silicon strip detectors" Nuclear instruments and methods in physics research 214(2-3) (1983) 253-260 described a telescope detector used for particle physics with routing traces on the same layer as the charge collecting electrodes. Thin and heavy metal sheets are suggested in U.S. Pat. No. 8,183,535 B2 Mats Danielsson et al. "Silicon detector assembly for x-ray imaging" to be attached to the subsets of silicon detectors to partly stop the scattered photons as a result of Compton scattering from reaching other silicon detectors.

Capacitance is one of the most critical parameters for a detector, which is directly related to the level of electronic noise of front-end electronics. The noise level needs to be as low as possible for any imaging detectors to acquire images with satisfactory quality. For energy-integrating detectors, in which the detected photons are integrated over a certain time interval, the electronic noise is integrated in the readout signal, resulting in deteriorated image quality. For photon-counting detectors, the lowest energy threshold should be set higher than the level of noise floor to reject fake counts induced by noise. Therefore, lowering the input capacitance to the front-end electronics is an important task when designing a new detector.

For semi-conducting detectors such as silicon detectors, taking the single-sided silicon strip detector as a particular example, the following two contributions are the main capacitance sources, the backside capacitance which is the capacitance between a charge collecting electrode and the backside of the silicon substrate, and the inter-strip capacitance which is the capacitance between neighboring charge collecting electrodes. For detectors with routing traces connecting the charge collecting electrodes and the input of front-end electronics, the trace capacitance also plays a significant role, including the capacitance between neighboring routing traces, the capacitance between a routing trace and a charge collecting electrode. Out of the range of the x-ray sensitive area, the silicon substrate might be covered by a large area of implantation layer which would also contribute to capacitance if there are routing traces running on top of that.

There has been a considerable interest in edge-on silicon detectors for medical imaging in particular for imaging with high-energy x-rays. However, when the number of depth segments is larger than one, a problem arises in conjunction with routing to the front-end electronics. A design with two metal layers is described by Cheng Xu et al.: "Energy resolution of a segmented silicon strip detector for photon-counting spectral CT" Nuclear Instruments and Methods in Physics Research 715(2013)11-17, where the routing traces run on a different metal layer than that of charge collecting metal electrodes, exhibiting higher capacitance and complexity in implementation. And more dead space is added by the insulator material between two metal layers, which results in a loss in geometrical efficiency. It is also suggested in U.S. Pat. No. 8,183,535 B2 Mats Danielsson et al. "Silicon detector assembly for x-ray imaging" to spread out the front-end electrodes over the area of the sensor or on top of the sensor, with which the front-end electronics would be exposed to radiation and also the front-end electronics would take space and make impossible a very dense packing. Therefore, it is desirable to provide a way to conduct routing traces to the front-end electronics with reduced implementation complexity and optimal capacitance to the front-end electronics.

SUMMARY

The proposed technology aims to provide an edge-on semi-conducting detector that at least mitigates some of the capacitance related problems associated with detectors having routing traces connecting the charge collecting electrodes with the input of front-end electronics.

A specific object of the proposed technology is to provide a photon counting edge-on semi-conducting detector having improved capacitance characteristics. In particular to provide a photon counting edge-on semiconducting detector with reduced capacitance.

Another object is to provide a method for manufacturing a photon counting edge-on semi-conducting detector having improved capacitance characteristics, in particular reduced capacitance.

According to a first aspect of the proposed technology there is provided an edge-on photon counting detector. The detector comprises a semi-conducting substrate that comprises a first end adapted to face an x-ray source and a second end opposite the first end in the direction of incoming x-rays. The semi-conducting substrate comprises at least one strip having N depth segments, N≥2. Each of the depth segments comprises a charge collecting metal electrode. The semi-conducting substrate also comprises a charge collecting side comprising doped regions and insulating regions. Each of the charge collecting metal electrodes is arranged over a corresponding doped region and is connected to a respective routing trace arranged on the insulating regions. The respective routing trace being adapted to conduct signals from the charge collecting metal electrode to a read-out pad, that is connectable to front-end electronics, arranged at the second end.

According to a second aspect of the proposed technology there is provided a method for manufacturing a charge collecting surface for an edge-on detector. The method comprises providing a semi-conducting substrate, the semi-conducting substrate having a first end adapted to face an x-ray source and a second end opposite the first end. The method also comprises providing a surface of the semi-conducting substrate, referred to as the charge collecting surface, with doped regions, the doped regions having a first type of doping. The method also comprises providing an insulating layer on the regions of the second surface that are not provided with doped regions. The method also comprises arranging a read-out pad at the second end of the semi-conducting substrate. The method further comprises depositing a single metal layer on top of the charge collecting surface comprising the doped regions and the insulating layer. The method further comprises patterning the single metal layer in order to i) form charge collecting metal electrodes on top of the doped regions, and ii) form routing traces on top of the insulating layer that connects the charge collecting metal electrode with the read-out pad.

Embodiments of the proposed technology provides an edge-on detector having excellent capacitance characteristics. Such a detector will in turn ensure that the noise levels at the front-end electronics are reduced which will increase the quality of the acquired images. Further advantages will become clear upon reading later sections.

BRIEF DESCRIPTION OF DRAWINGS

FIG. 7 is a schematic diagram illustrating the cross section of the bottom area of Silicon substrate.

FIG. 8a is a schematic diagram illustrating the routing area at sensor bottom with a full P-plus implantation.

FIG. 8b is a schematic diagram illustrating the routing area at sensor bottom without P-plus implantation underneath routing traces.

FIG. 9 is a schematic diagram of a trapezoid-shaped sensor.

FIG. 10 is a schematic diagram of a sensor with chamfered corners.

DETAILED DESCRIPTION

The present invention aims to provide an edge-on semi-conducting strip detector having improved capacitance characteristics. The provided strip detector is suitable to use in x-ray imaging in an energy range from 40 keV to 250 keV. In order to achieve the goal, a metal layer may be implemented on the charge collecting side of the detector in order to obtain conducting routing traces that runs in the same metal layer as charge collecting electrodes. In addition, methods and strategies are provided to reduce the capacitance associated the strip detector.

Figure 11:
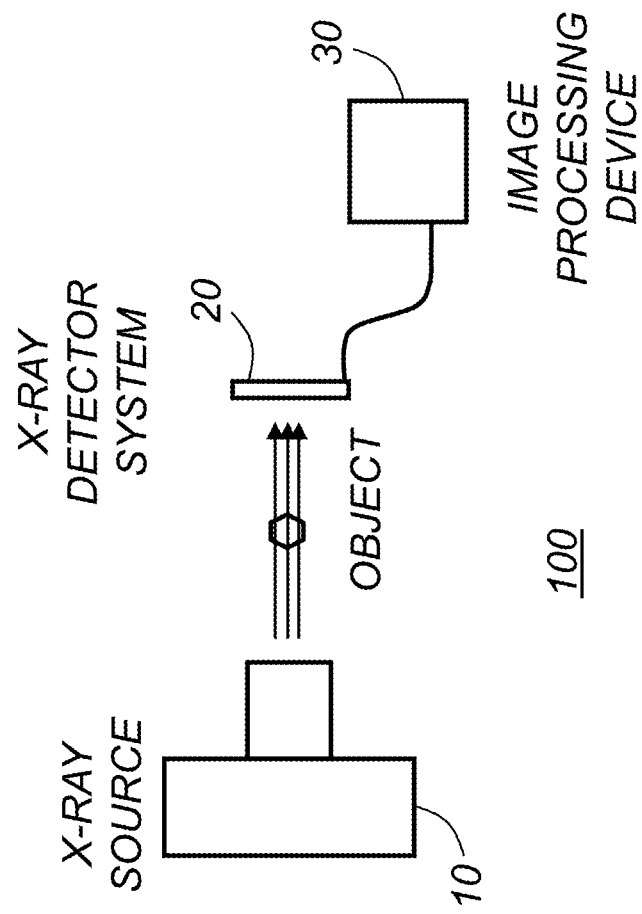
FIG. 11 illustrates an x-ray imaging system where an edge-on detector according to the proposed technology may be used.

Before describing various embodiments of the proposed technology, it may be useful to begin with an overview of the technology where an edge-on semi-conducting strip detector can be used. To this end reference is made to FIG. 11. In this non-limiting example, an x-ray imaging system 100 basically comprises an x-ray source 10, an x-ray detector system 20 and an associated image processing device 30. In general, the x-ray detector system 20 is configured for registering radiation from the x-ray source 10 that may have been focused by optional x-ray optics and passed an object or subject or part thereof. The x-ray detector system 20 is connectable to the image processing device 30 via suitable analog processing and read-out electronics (which may be integrated in the x-ray detector system 20) to enable image processing and/or image reconstruction by the image processing device 30.

Figure 12:
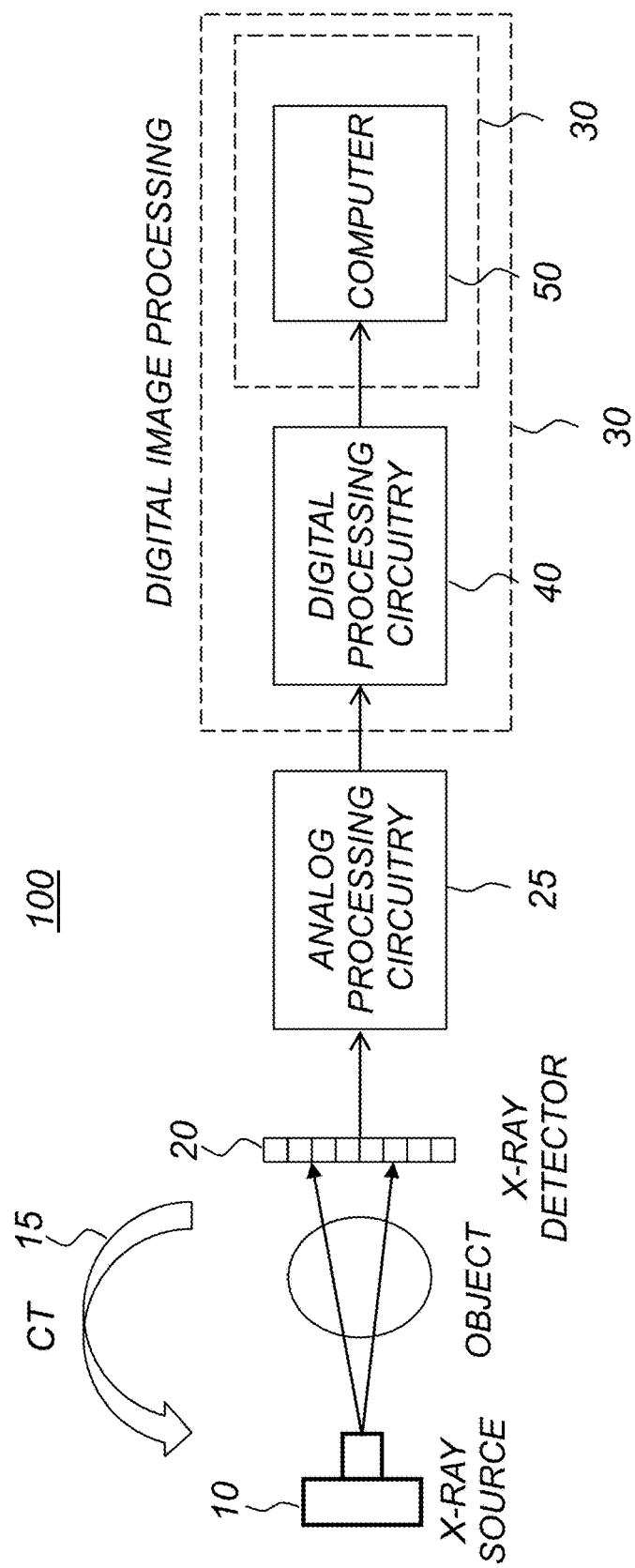
FIG. 12 provides another illustration of an x-ray imaging system where an edge-on detector according to the proposed technology may be used.

As illustrated in FIG. 12, another example of an x-ray imaging system 100 comprises an x-ray source 10, which emits x-rays; an x-ray detector system 20, which detects the x-rays after they have passed through the object; analog processing circuitry 25, which processes the raw electrical signal from the detector and digitizes it; digital processing circuitry 40 which may carry out further processing operations on the measured data such as applying corrections, storing it temporarily, or filtering; and a computer 50 which stores the processed data and may perform further post-processing and/or image reconstruction.

The overall detector may be regarded as the x-ray detector system 20, or the x-ray detector system 20 combined with the associated analog processing circuitry 25.

The digital part including the digital processing circuitry 40 and/or the computer 50 may be regarded as a digital image processing system 30, which performs image reconstruction based on the image data from the x-ray detector. The image processing system 30 may thus be seen as the computer 50, or alternatively the combined system of the digital processing circuitry 40 and the computer 50, or possibly the digital processing circuitry 40 by itself if the digital processing circuitry is further specialized also for image processing and/or reconstruction.

An example of a commonly used x-ray imaging system is a Computed Tomography (CT) system, which may include an x-ray source that produces a fan or cone beam of x-rays and an opposing x-ray detector system for registering the fraction of x-rays that are transmitted through a patient or object. The x-ray source and detector system are normally mounted in a gantry that rotates around the imaged object.

Accordingly, the x-ray source 10 and the x-ray detector system 20 illustrated in FIG. 12 may thus be arranged as part of a CT system, e.g. mountable in a CT gantry.

A challenge for x-ray imaging detectors is to extract maximum information from the detected x-rays to provide input to an image of an object or subject where the object or subject is depicted in terms of density, composition and structure. It is still common to use film-screen as detector but most commonly the detectors today provide a digital image.

The proposed technology relates in part to the particular design of a semiconductor edge-on detector. The semiconducting edge-on detector may comprises any suitable semiconducting material. Certain embodiments of the proposed technology relates to a detector substrate of Silicon. Other materials are however possible. Promising materials for photon-counting x-ray detectors are cadmium telluride (CdTe), cadmium zinc telluride (CZT) and silicon (Si). CdTe and CZT are employed in several photon-counting spectral CT projects for the high absorption efficiency of high-energy x-rays used in clinical CT. However, these projects are slowly progressing due to several drawbacks of CdTe/CZT. CdTe/CZT have low charge carrier mobility, which causes severe pulse pileup at flux rates ten times lower than those encountered in clinical practice. One way to alleviate this problem is to decrease the pixel size, whereas it leads to increased spectrum distortion as a result of charge sharing and K-escape. Also, CdTe/CZT suffer from charge trapping, which would lead to polarization that causes a rapid drop of the output count rate when the photon flux reaches above a certain level.

In contrast, silicon has higher charge carrier mobility and is free from the problem of polarization. The mature manufacturing process and comparably low cost are also its advantages. But silicon has limitations that CdTe/CZT does not have. Silicon sensors must accordingly be quite thick to compensate for its low stopping power. Typically, a silicon sensor needs a thickness of several centimeters to absorb most of the incident photons, whereas CdTe/CZT needs only several millimeters. On the other hand, the long attenuation path of silicon also makes it possible to divide the detector into different depth segments, as will be explained below. This in turn makes it possible for a silicon-based photon-counting detector to properly handle the high fluxes in CT.

Figure 13:
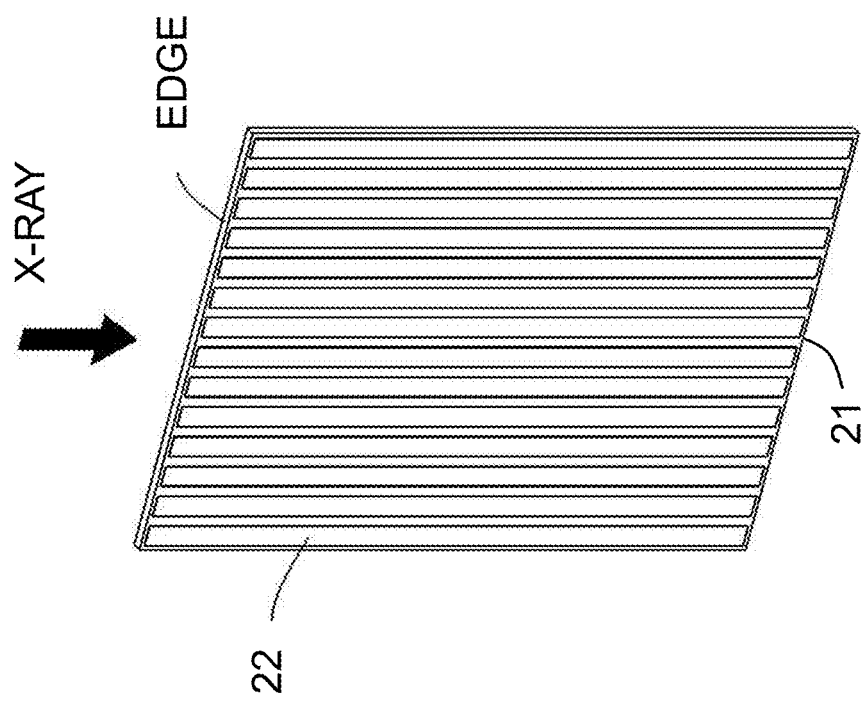
FIG. 13 is a schematic diagram illustrating an edge-on detector having a number of strips.

FIG. 13 provides a schematic diagram that illustrates an example of a semiconductor detector module. This is an example of a semiconductor detector module with the sensor part 21 split into detector elements or pixels 22, where each detector element (or pixel) is normally based on a diode having a charge collecting electrode as a key component. The x-rays enter through the edge of the semiconductor detector. As can be seen in the FIG. 16, the detector elements may be arranged in individual strips along the surface of the detector.

Figure 14:
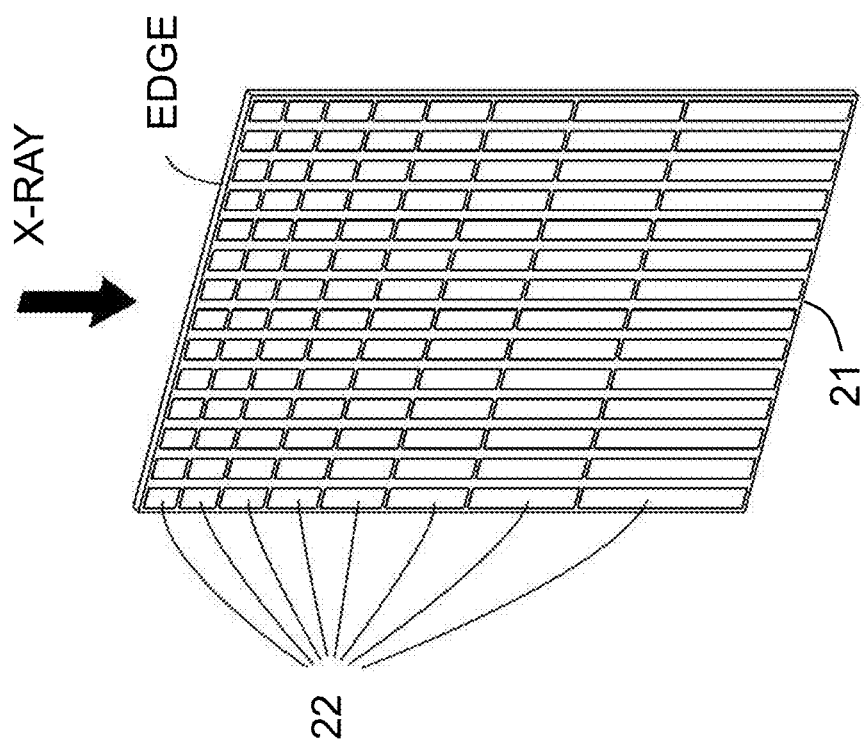
FIG. 14 is a schematic diagram illustrating an edge-on detector having a number of strips and a number of depth-segments.

FIG. 14 is a schematic diagram illustrating an example of semiconductor detector module according to another exemplary embodiment. In this example, the semiconductor sensor part 21 is also split into so-called depth segments 22 in the depth direction, again assuming the x-rays enter through the edge. It should be noted that each of the detector elements comprises a charge collecting electrode and corresponding routing traces adapted to convey signals from the charge collecting electrode to front-end electronics. Normally, such a detector element is an individual x-ray sensitive sub-element of the detector. In general, the photon interaction takes place in a detector element and the thus generated charge is collected by the corresponding electrode of the detector element. Each detector element typically measures the incident x-ray flux as a sequence of frames. A frame is the measured data during a specified time interval, called frame time.

Figure 15:
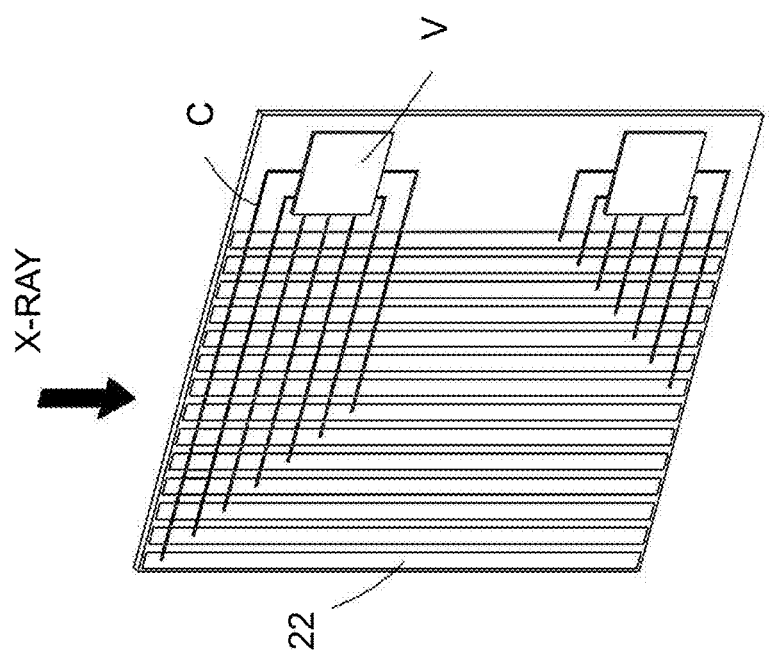
FIG. 15 is a schematic diagram illustrating how routing traces are connected to the front-end electronics on an edge-on detector.

FIG. 15 is a schematic illustration of semiconductor detector module according to another exemplary embodiment. Routing traces C connects the charge collecting electrodes of the detector with inputs of front-end electronics V. The readout pads are not disclose in FIG. 15, instead it is shown how the routing traces connects to front-end electronics or circuits attached to the detector. The readout pads are in this drawing arranged underneath the front-end electronics.

Depending on the detector topology, a detector element may correspond to a pixel, especially when the detector is a flat-panel detector. A depth-segmented detector may be regarded as having a number of detector strips, each strip having a number of depth segments. For such a depth-segmented detector, each depth segment may be regarded as an individual detector element, especially if each of the depth segments is associated with its own individual charge collecting electrode.

The detector strips of a depth-segmented detector normally correspond to the pixels of an ordinary flat-panel detector. However, it is also possible to regard a depth-segmented detector as a three-dimensional pixel array, where each pixel (sometimes referred to as a voxel) corresponds to an individual depth segment/detector element.

Having described the overarching system where an edge-on detector may be used, in what follows we will describe a particular edge-on detector that provides improved capacitance characteristics.

The proposed technology provides an edge-on photon counting detector comprising a semi-conducting substrate 102 comprising:
- a first end 11 adapted to face an x-ray source and a second end 12 opposite the first end 11 in the direction of incoming x-rays,
- at least one strip having N depth segments, N≥2, each of the depth segments comprising a charge collecting metal electrode 104,
- a charge collecting side comprising doped regions 107 and insulating regions 106. Each of the charge collecting metal electrodes 104 is arranged over a corresponding doped region 107 and is connected to a respective routing trace 103 arranged on the insulating regions 106, the respective routing trace 103 being adapted to conduct signals from the charge collecting metal electrode to a read-out pad 105, connectable to front-end electronics, arranged at the second end.

Figure 1:
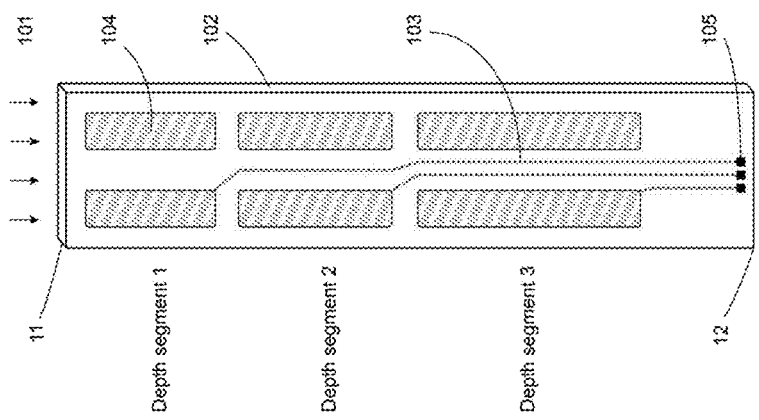
FIG. 1 is a schematic diagram of part of a sensor.

FIG. 1 is a schematic diagram illustrating an example of part of such a detector. In this embodiment, the semi-conducting substrate may comprise N-type crystalline silicon, and the detector may be oriented edge-on with regard to the incoming x-rays 101 that impinges from an edge of the detector. The semi-conducting substrate 102 of the detector is split into strips and each strip is subsequently split into a number of depth segments in the depth direction which is also the x-ray incident direction. Each depth segment may be formed by a back-biased diode which should be fully depleted so that the whole volume works as detector for x-rays. In the present embodiment, each depth segment within a strip has an individual charge collecting electrode on the charge collecting side with metal contact deposited on top of a doped region 107, e.g., on top of a P-plus implantation, which is connected to the associated front-end electronics via routing traces 103. The metal contact of the charge collecting electrode is labeled as 104 in FIG. 1. Only the routing traces for the left column of metal charge collecting electrodes are illustrated in FIG. 1. One example of front-end electronics is an Application-specific-integrated circuit, ASIC. The ASIC contains a number of signal processing channels each of which is connected to a corresponding charge collecting electrode. In the present embodiment, the routing traces 103 used to conduct signals from the charge collecting electrodes to the front-end electronics are arranged so that they run in the area between charge collecting electrodes as illustrated in FIG. 1. The charge collecting side of the detector is in the present embodiment therefore provided with a single metal layer. This particular feature renders the use of an extra layer for routing traces obsolete. The benefits of the implementation with only a single metal layer include less capacitance, higher geometrical efficiency and also a reduction in complexity of the implementation. It can also be seen in FIG. 1 that the inputs of front-end electronics are attached to the readout pads 105 on the detector. This can be done by means of wire bonding, bump bonding, or any other multi-chip module technologies. In a preferred embodiment, the front-end electronics may be attached to the bottom edge 12 of the detector where the routing traces are converging.

According to a particular embodiment of the proposed technology there is provided an edge-on detector wherein the semi-conducting substrate comprises silicon.

According to another embodiment of the proposed technology there is provided an edge-on detector wherein the charge collecting metal electrodes 104 and the routing traces 103 are manufactured from the same metal. That is, the charge collecting metal electrodes 104 and the routing traces 103, are provided in a single metal layer on the charge collecting side of the substrate 102. The metal used for the charge collecting electrode and the routing traces may in a particular embodiment be aluminum.

By way of example, the edge-on detector according to the proposed technology may comprise insulating regions 106 of silicon dioxide.

Figure 2:
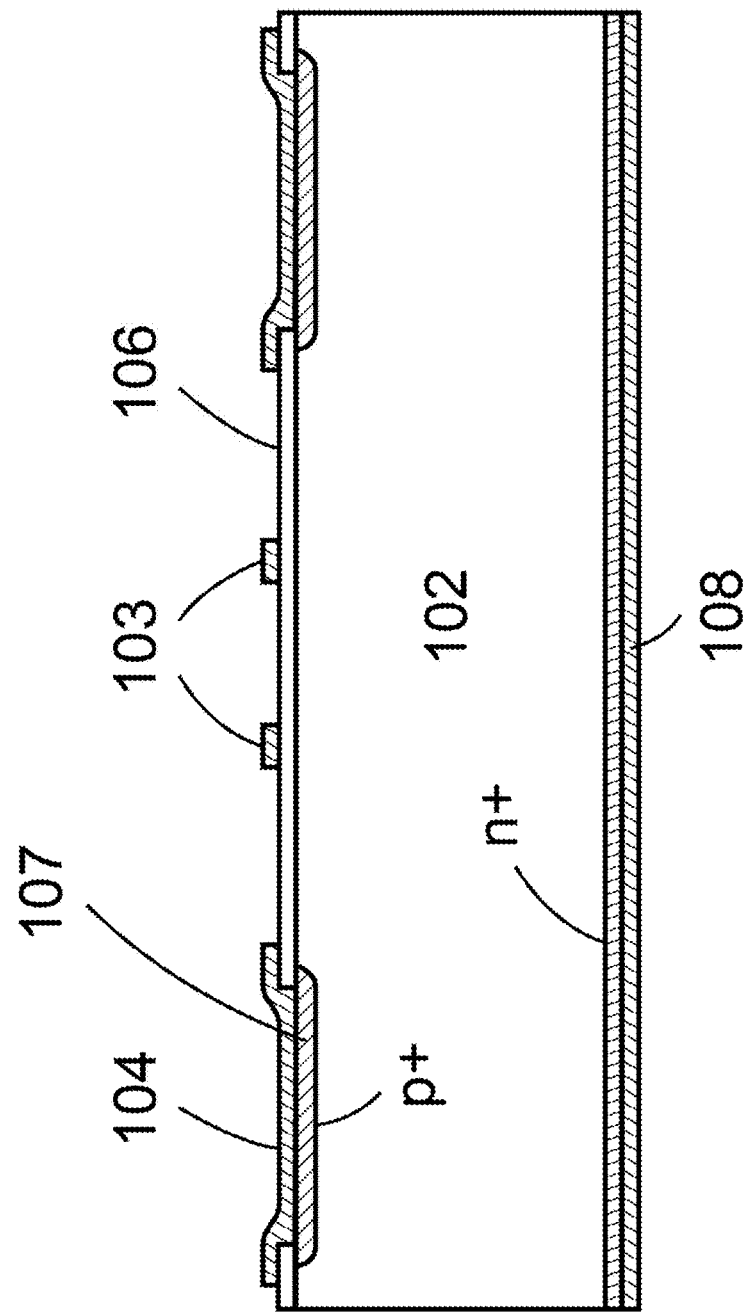
FIG. 2 is a schematic diagram of the cross section of a sensor.

FIG. 2 is a schematic diagram illustrating a cross section of a semi-conducting substrate, e.g. a silicon substrate, 102 according to an exemplary embodiment of the proposed technology. The cross section illustrates an edge-on detector having two strips, each strip having two charge collecting electrodes and two routing traces 103 in between. The metal contacts 104 of the charge collecting electrodes may for example be deposited on top of P-plus implantation so that they run on the same metal layer as the routing traces. A thin insulating layer, e.g. a silicon dioxide layer, 106 is used as passivation on the front side of the silicon substrate. In the present embodiment, a bias is fed from the backside contact 108 through N-plus implantation to fully deplete the detector. It should be recognized that FIG. 2 is only an illustrative example, the detector may contain more details, it may for example, contain more passivation layers on the charge collecting side.

Narrow charge collecting electrodes are preferred from a capacitance perspective. Another benefit obtained with narrow charge collecting electrodes is that the fitting of routing traces in between charge collecting electrodes are facilitated.

Figure 3:
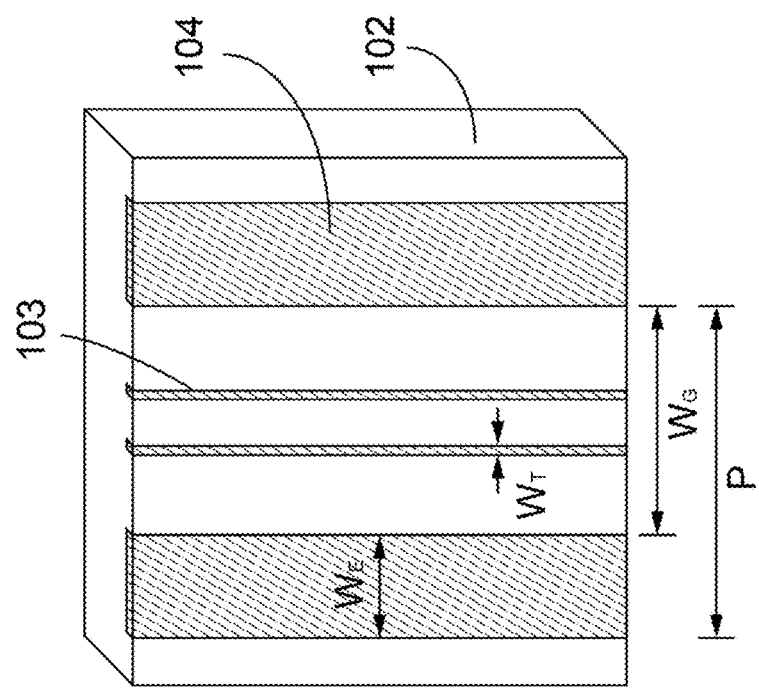
FIG. 3 is a schematic diagram illustrating the widths of charge collecting electrodes and routing traces.

FIG. 3 is a schematic diagram of part of a semi-conducting substrate, e.g. a silicon substrate, 102. Illustrated in FIG. 3 is a magnified view of the third depth segment in FIG. 1, with metal contacts 104 of charge collecting electrodes and routing traces 103 running on the same metal layer. Letting P represent the pitch of the strips, $W_E$ represent the width of charge collecting electrodes and $W_T$ represent the width of routing traces, the ratio of electrode width to strip pitch is given by:

$$R_E = W_E/P$$

And the ratio of routing trace width to strip pitch is given by:

$$R_T = W_T/P.$$

According to a particular embodiment of the proposed technology there is provided an edge-on detector wherein the number of strips is at least two and wherein the width dimensions of the charge conducting metal electrodes are such that the ratio of the charge collecting metal electrode width to strip pitch is less than 0.8 in order to reduce capacitance.

Figure 4:
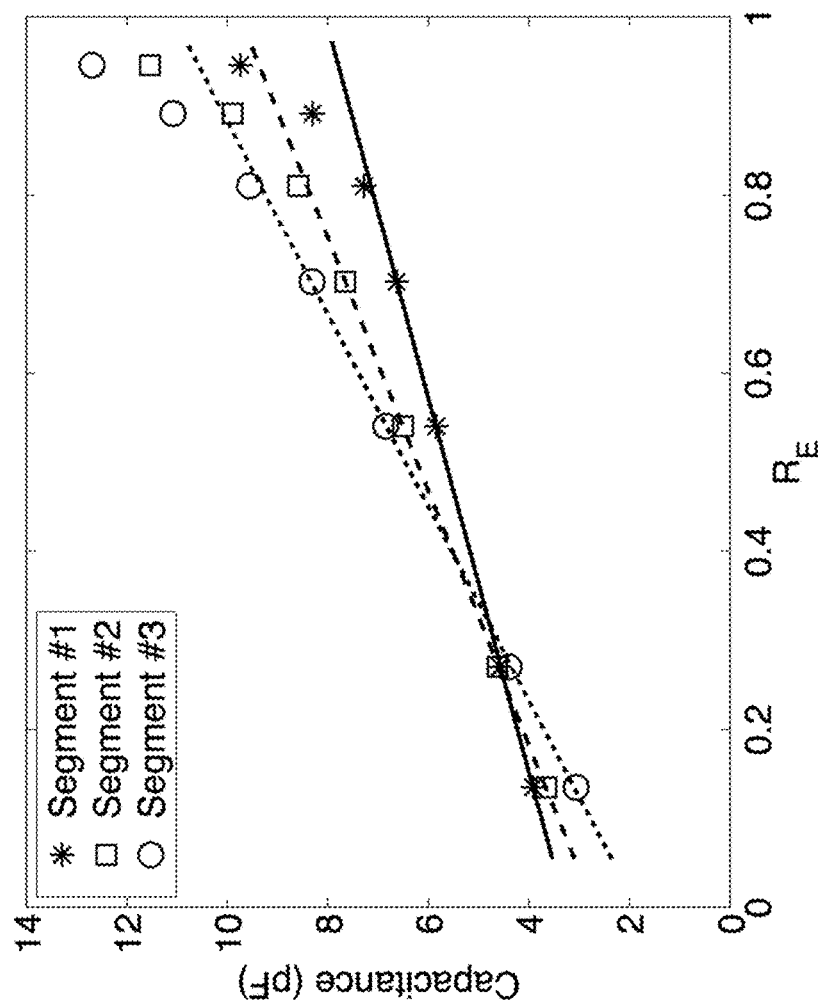
FIG. 4 depicts capacitance as a function of ratio of electrode width to strip pitch.

FIG. 4 illustrates the simulated capacitance as a function of the ratio of electrode width to strip pitch for a detector having 0.6 mm thick silicon substrate, 0.37 mm strip pitch and 5 µm wide routing traces. Three depth segments are simulated with the lengths of depth segments of 10 mm, 15 mm and 20 mm, respectively. There is another metal surface as anti-scatter sheet or the surface of another detector which is 20 µm distant to the charge collecting side of the simulated detector with 30% glue and 70% air in between. When the ratio is below 0.8, the capacitance is nearly linearly proportional to the ratio, but when the ratio is larger than 0.8, there is a dramatically increase of the capacitance. This result has been validated for other strip pitches.

According to yet another embodiment of the proposed technology there is provided an edge-on detector wherein the number of strips is at least two and wherein the width dimension of the routing traces are such that the ratio of the routing trace width to strip pitch is less than 0.05. This embodiment provides an edge-on detector having improved capacitance characteristics, i.e. displaying reduced capacitance.

Figure 5:
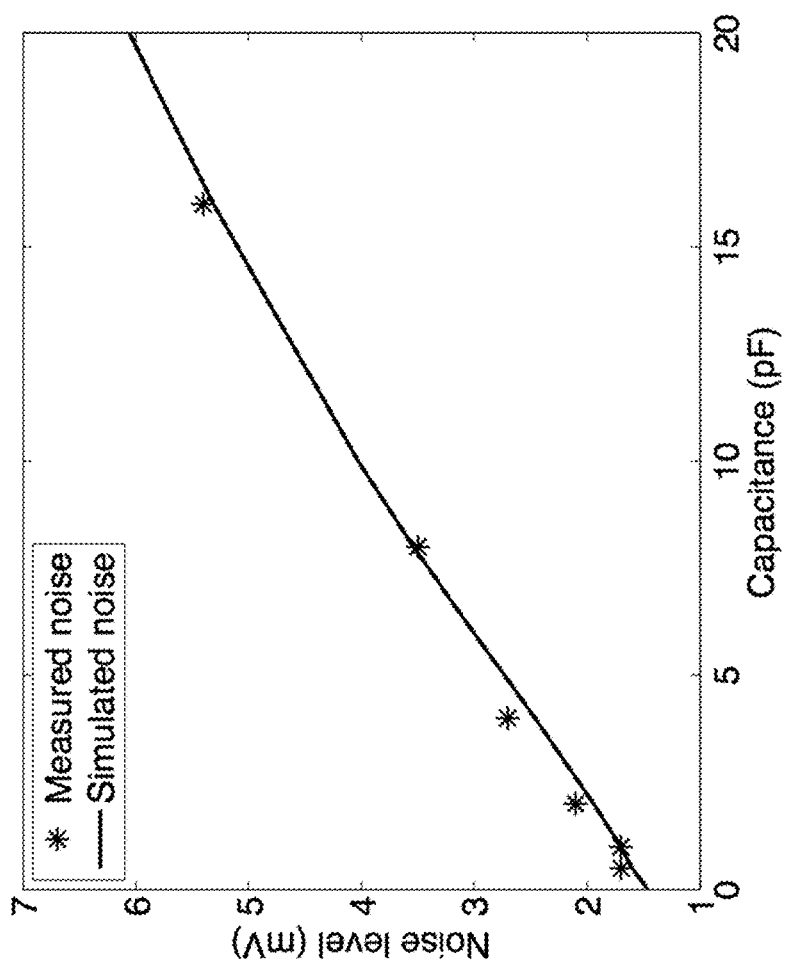
FIG. 5 depicts noise level as a function of capacitance.

FIG. 5 shows a nearly linear relationship between noise level of the detector and the detector capacitance. Therefore, it is concluded that the ratio $R_E$ is preferably to be less than 0.8 for the width of charge collecting electrodes from capacitance and signal to noise ratio perspective. It can further be concluded that the ratio $R_T$ is preferable to be less than 0.05 for the width of routing traces in the present embodiment.

For the bottom depth segments with more routing traces running in between, more space is required for routing traces to be fit in between neighboring charge collecting electrodes. A ratio of the gap between neighboring charge collecting electrodes to strip pitch is defined as:

$$R_G = W_G/P,$$

which preferably should be larger than 0.05×(N+1) with N≥2 being the number of depth segments.

It should be recognized that the charge collecting electrodes cannot be made extremely narrow since the bare area of the interface between silicon and silicon dioxide is sensitive to radiation without an implantation cover. There is therefore a tradeoff between capacitance and radiation hardness of the detector.

According to another embodiment of the disclosed edge-on detector, the semi-conducting substrate 102 is provided with doped regions in the area adjacent to the read-out pad arranged at the second end. FIG. 8a provides a schematic illustration of this embodiment. The doped region adjacent to the read-out pad is denoted 202 while the area with doped regions on which charge collecting electrodes are provided are denoted 201. The doped regions are in this particular illustration P-plus doped regions. This is however merely an example, other types of doping may be used.

Figure 6:
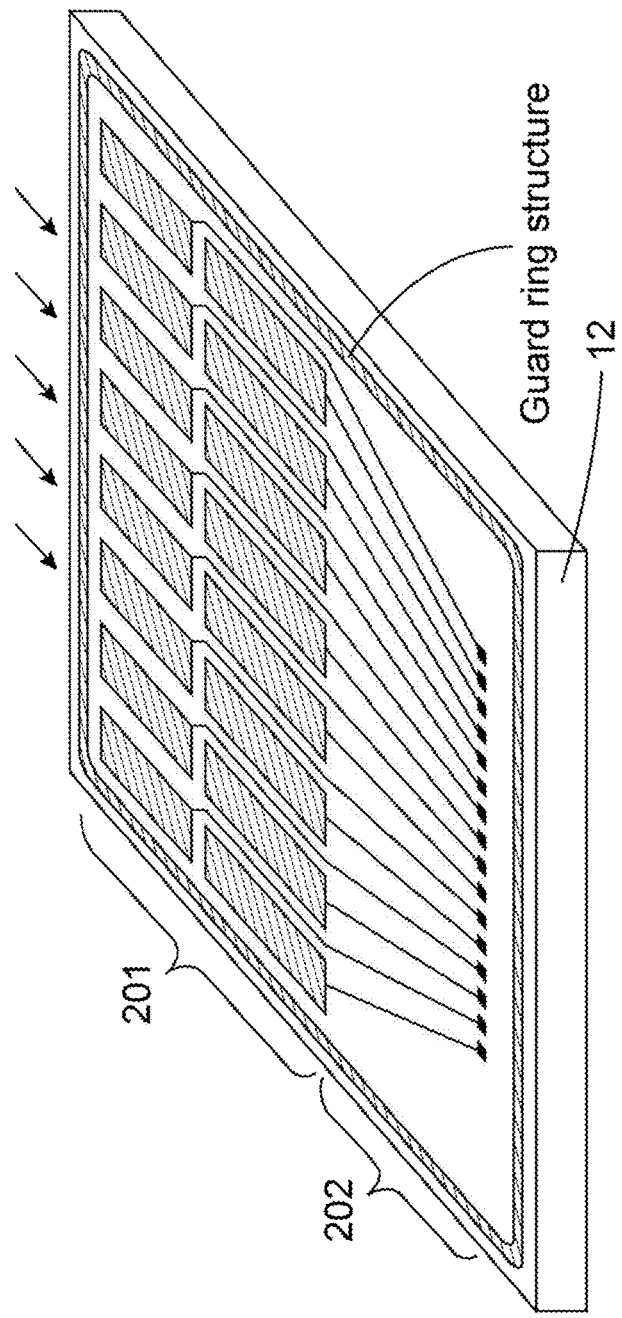
FIG. 6 is a schematic diagram illustrating a sensor with 2 depth segments and how routing traces are connected to readout pads.

As indicated in FIG. 1, at the second end of the detector, the routing traces are connected to the readout pads which are subsequently connected to the front-end electronics. There is a requirement to decrease the length of routing traces and distribute the routing traces sparsely to minimize capacitance to the input of front-end electronics. It is conceivable to have front-end electronics covering a large part of the detector or the whole detector at the end of the last charge collecting electrodes. However, the integrated circuits of front-end electronics are tend to be small today for high speed, low power and reduced manufacturing cost, which means that in most cases, the front-end electronics can only cover a small part of the detector. There are detectors with small pixel pitches, which are comparable to the input pitch of front-end electronics, for example, mammography with pixel pitch of a few tens of micrometers. For such detectors, the front-end electronics can be bonded very close to the charge collecting electrodes with minimum length of routing traces and thus minimum capacitance. However, there are also some x-ray imaging detectors with large pixel pitches, for example, x-ray computed tomography, where the pixel pitch is much larger than the input pitch of front-end electronics. Such cases are illustrated in FIG. 6, the routing traces will most likely occupy an area out of the x-ray sensitive part 201 of the detector and converge to the readout pads in the area 202 of the detector, forming a fan shape. A guard ring structure is a feature on the charge collecting side that is specially provided to minimize edge effects and to provide guarantees of a defined homogeneous potential for all strips and all depth segments. A guard ring structure is illustrated in FIG. 6. Usually, but not always, one or several guard rings are placed between the active part of a detector and the detector edge. The first ring is directly connected to a certain potential, usually ground, to provide a drain for the leakage current generated at the edge of the detector. There might be one or more floating rings to discretely adapt the potential in order to make the voltage drops from outside in smoothly. The rings normally have the same structure as strips and depth segments, with same type of metal and doping. Only the metal part of one ring is illustrated in FIG. 6.

FIG. 7 is a schematic diagram illustrating an example cross section of the area adjacent to the read-out pad of silicon substrate according to an exemplary embodiment. The routing traces C are running on top of an insulating layer 106 comprising silicon dioxide. Usually, but not always, the insulating layer 106 covers the whole area adjacent to the read-out pad. Underneath the silicon dioxide, in one embodiment of the present claimed invention, with N-type crystalline silicon, a P-plus implantation 203 that extends from guard ring of the detector usually covers the whole bottom area which would however yield high capacitance between routing traces and the layer of P-plus implantation given typical thickness of silicon dioxide.

According to another embodiment of the disclosed edge-on detector, the semi-conducting substrate B is provided with doped regions in an area adjacent to the read-out pads arranged at the second end. FIG. 8a provides a schematic illustration of this embodiment. In this embodiment, the doped region covers the whole area adjacent to the read-out pads. The doped regions are in this particular illustration P-plus doped regions. This is however merely an example, other types of doping may be used.

Figure 8C:
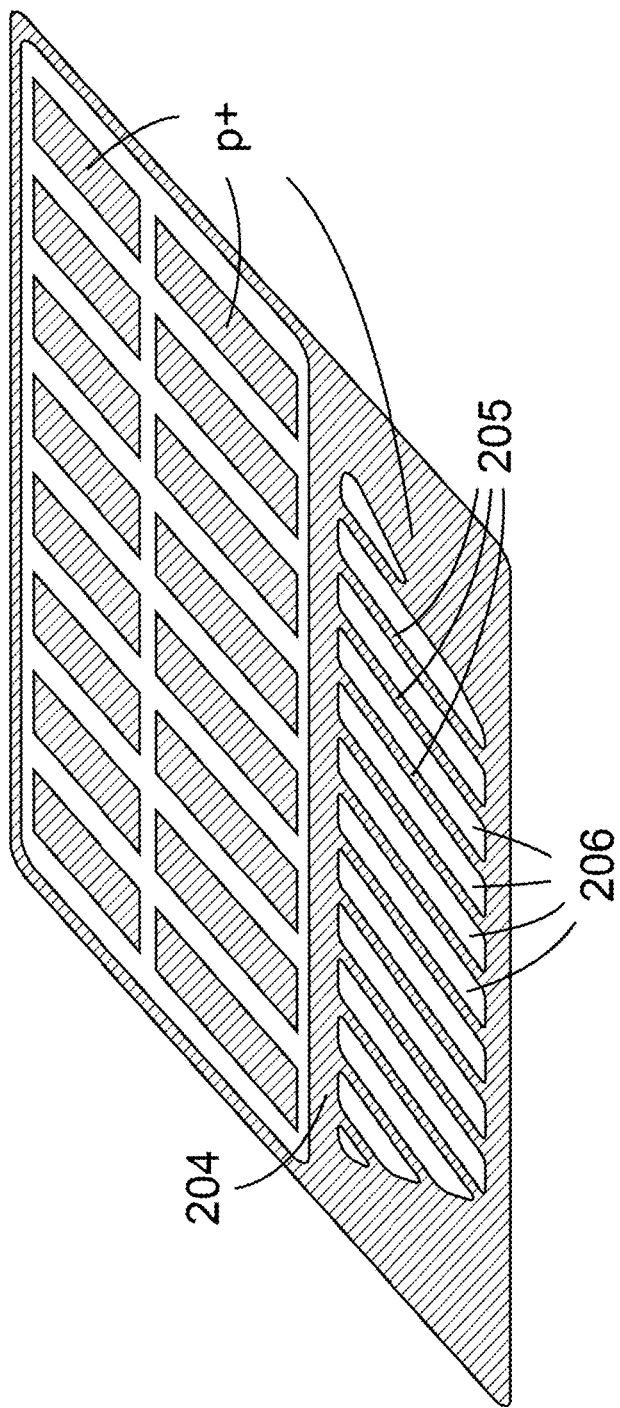
FIG. 8c is a schematic diagram illustrating the routing area at sensor bottom being P-plus implanted in strips.

Another embodiment provides an edge-on detector wherein the area adjacent to the read-out pad are further provided with insulating regions, whereby the doped regions and the insulating regions are arranged to form a pattern so that the routing traces run on the insulating regions to the read-out pad. Particular examples of such patterns are given in FIGS. 8b and 8c. In FIG. 8b it is illustrated how an area of an insulating region 203 is surrounded by a doped region 204. The routing traces 103, not shown in the drawing, are intended to be arranged on top of the insulating region. In FIG. 8c it is illustrated how insulating regions may be arranged in the area adjacent to the read-out pads to allow for the routing traces to connect to the read-out pads in a fan-shaped manner.

FIGS. 8a-c are schematic diagrams corresponding to different implementations of the implantation layer for the sensor shown in FIG. 6, illustrating different strategies to cope with capacitance from routing traces running in the area adjacent to the read-out pad of the detector. The x-ray sensitive part 201 contains the P-plus implantation of charge collecting electrodes, P-plus in FIG. 2, and the area 202 near the second end of the detector also contains a P-plus implanted area, P-plus in FIG. 7.

In one embodiment of the present claimed invention, as illustrated in FIG. 8a, there is implantation of the charge collecting electrodes on the implantation layer, surrounded by a non-implanted area. An implanted area extended from the implantation of guard ring covers the whole area adjacent to the read-out pad at the second end of the sensor, which results in a relatively high capacitance in the present embodiment. Only one ring of the guard ring structure is shown as an illustration.

In another embodiment of the present claimed invention, as illustrated in FIG. 8b, at the bottom area of the sensor, an implanted area is still extended from the guard ring but only in close proximity to the outmost traces, so that for the area under traces, indicated by 203, there is no implantation. There is a long strip implanted area 204 near charge collecting electrodes, connected to the guard ring of the sensor to guide leakage current generated in the area at the second end of the sensor to the guard ring of the sensor and prevent disturbance produced in the area at the second end of the sensor from reaching the x-ray sensitive part. The present embodiment is supposed to have least capacitance induced by routing traces running in the area at the second end of a sensor.

In order to reduce the capacitance induced between routing traces and P-plus implantation in the area at the second end of a sensor, but also keep other aspects of the sensor reliable and under control in comparison with the previous embodiment, such as leakage current, break down voltage, another embodiment is provided. FIG. 8c is a schematic diagram illustrating strip pattern of P-plus implantation 205 separated by non-implanted regions 206 in the area adjacent to the read-out pad. The P-plus implant strips are connected to the guard ring of the sensor. Although in this example implant strips are parallel to charge collecting electrodes along the sensor depth direction, the implant strips can also be along other directions, for example, perpendicular to the charge collecting electrodes, or in both directions to form a grid pattern, or any other patterns. The capacitance induced by routing traces in the area adjacent to the read-out pad at the second end of a sensor is reduced correspondingly by decreasing the area of P-plus implantation. Letting a represent the width of implant strips, b represent the width of non-implanted gaps, the capacitance can thus be reduced by approximately a factor of $b/(a+b)$. In order to further reduce the capacitance, in a particular embodiment of the present invention, the non-implanted regions between implant strips can be arranged to follow the path of routing traces which gives even less overlap between routing traces and P-plus implantation and thus less capacitance.

Only one row of readout pads are depicted in the description of the above embodiments for illustrative purpose, but more than one row of readout pads are apparent for those skilled in the art.

The proposed technology also provides an edge-on detector wherein the semi-conducting substrate have a tapered shape, whereby the first end 11 of the semi-conducting substrate have a first width and the second end 12 of the semi-conducting substrate have a second width, larger than the first width. Such an edge-on detector may also contain a semi-conducting substrate that comprises at least two strips of charge collecting metal electrodes, where the strips are angled relative each other so that the charge collecting electrodes are provided on the charge collecting side in a tapered pattern that is adapted to the tapered shape of the substrate.

Designs like these may be particularly useful when large-sized sensors are utilized. An illustration of the design is provided by as the ones illustrated in FIG. 9. It can be seen in FIG. 9 that each individual depth segment is tilted and arranged for pointing back to the x-ray source along the incoming direction of x-rays 101. A trapezoid shape of a sensor forms an exemplary embodiment. Such a trapezoid shape of sensors facilitates the extension of detector width by mounting sensors side by side with minimum dead space in comparison with the squared shape of the sensors, because each sensor should also be arranged for pointing back to the x-ray source. However, it should be recognized that a squared shape of large-sized sensors is also covered by the present claimed invention.

The proposed technology also provides an edge-on detector wherein the second end of the substrate comprises at least one chamfered corner. FIG. 10 is a schematic diagram illustrating another example of a sensor with one corner being removed creating a chamfered shape of the sensor, which reduces capacitance induced from the nearest sensor and also facilitates the mounting of front-end electronics, by allocating more space for the bonding connection of circuitry. The front-end electronics can be connected to the sensor by wire bonding, bump bonding using flip-chip technology, or any other bonding technology to form a multi-chip module.

As has been described above, the proposed technology provides an edge-on semi-conducting strip detector that have improved capacitance characteristics. The strip detector is suitable to use in x-ray imaging in an energy range from 40 keV to 250 keV. A particular feature of such a detector is that a single metal layer may be implemented on the charge collecting side of the detector. This single layer comprises the conducting routing traces as well as the charge collecting electrodes. This particular feature provides for a detector having improved capacitance characteristics. The proposed technology therefore provides a method for manufacturing a charge collecting side of such an edge-on detector.

To this end there is provided a method for manufacturing a charge collecting surface for an edge-on detector, wherein the method comprises:
  providing S1 a semi-conducting substrate 102, the semi-conducting substrate having a first end adapted to face an x-ray source and a second end opposite the first end;
  providing S2 a surface of the semi-conducting substrate 102, referred to as the charge collecting surface, with doped regions 107;
  providing S3 an insulating layer 106 on the regions of the second surface that are not provided with doped regions 107;
  arranging S4 a read-out pad 105 at the second end of the semi-conducting substrate;
  depositing S5 a single metal layer on top of the charge collecting surface comprising the doped regions 107 and the insulating layer; and
  patterning S6 the single metal layer in order to:
    i) form charge collecting metal electrodes on top of the doped regions 107, and;

ii) form routing traces 103 on top of the insulating layer 106 that connects the charge collecting metal electrode with the read-out pad 105.

Figure 16:
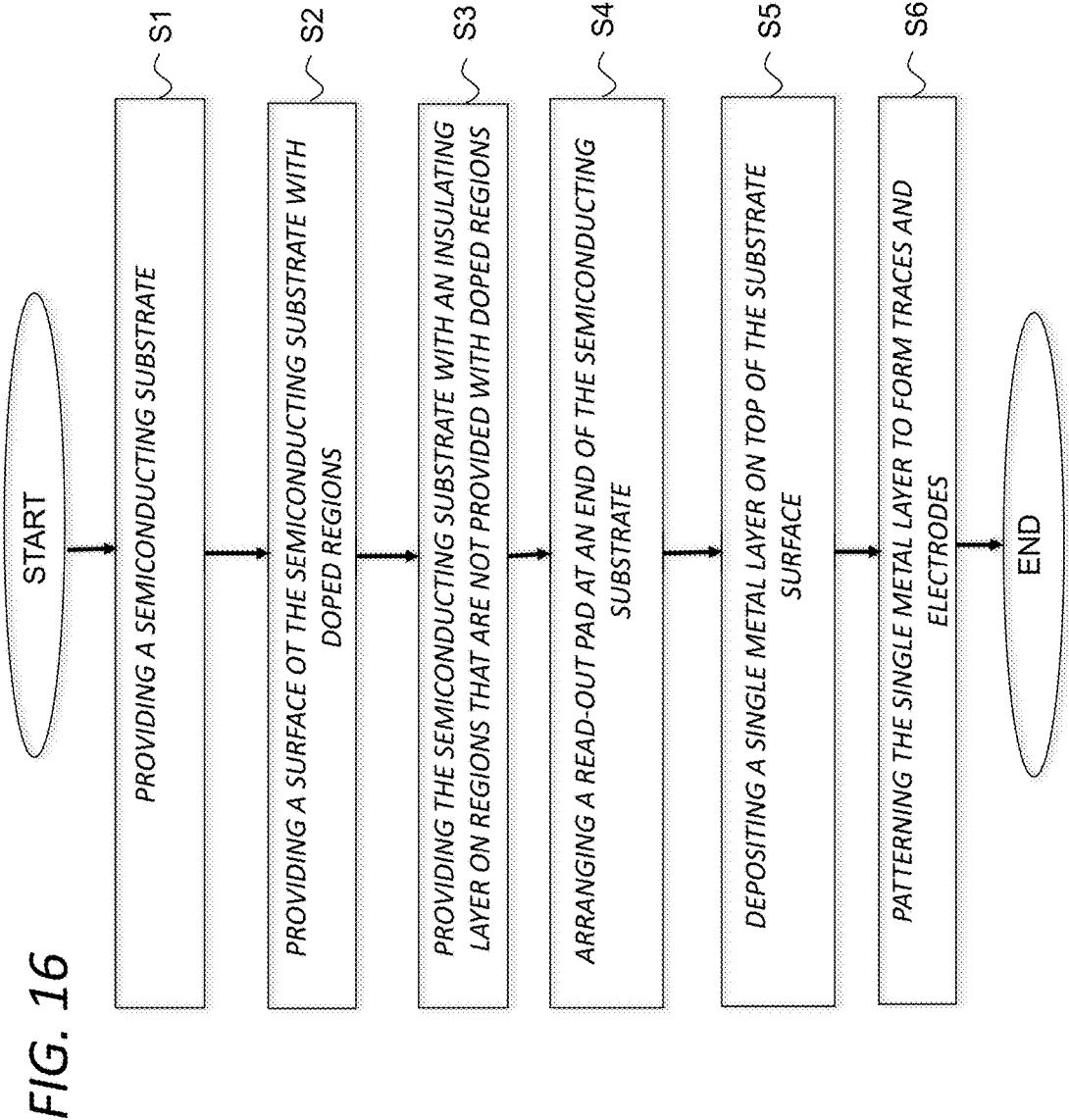
FIG. 16 is a flow diagram illustrating a method for manufacturing a charge collecting side of an edge-on detector.

The proposed method is illustrated schematically in the flow diagram in FIG. 16.

According to a particular embodiment of the proposed method, the step S5 of depositing a single metal layer comprises using Physical Vapor Deposition (PVD), plating and/or Chemical Vapor Deposition (CVD).

According to another particular embodiment of the proposed method the step S6 of patterning the single metal layer comprises the use of photolithography.

Still another embodiment of the proposed technology provides a method wherein the step S1 of providing a semi-conducting substrate 102 comprises to provide a silicon substrate.

Yet another embodiment of the proposed technology provides a method the step of depositing S5 a single metal layer on top of the charge collecting surface comprises depositing a single aluminum layer. It should be noted that several metal layers may be deposited on top of the first metal layer. One may for example perform the suggested method a first time in order to get a charge collecting side having a first metal layer patterned to form routing traces and charge collecting electrodes and then repeat the depositing step one or several times in order to obtain several metal layers forming charge collecting electrodes and routing traces that are arranged on top of each other.

According to an optional embodiment of the proposed technology there is provided a method wherein the step S3 of providing an insulating layer 106 on the regions of the second surface that are not provided with doped regions 107, comprises providing a silicon dioxide layer.

According to particular embodiment of the proposed technology there is provided a method wherein the step S6 of patterning the metal layer comprises to form at least two strips of charge collecting electrodes, where each of the charge collecting electrodes have width dimensions such that the ratio of the charge collecting metal electrode width to strip pitch is less than 0.8.

Another embodiment of the proposed technology provides a method wherein the step S6 of patterning the metal layer further comprises to form routing traces having width dimension such that the ratio of the routing trace width to strip pitch is less than 0.05.

The proposed technology also provides an edge-on detector comprising a charge collecting surface manufactured according to the methods described above.

The embodiments shown in the present disclosure show the examples with N-type crystalline silicon, it should be recognized that the proposed technology also can be applied to P-type crystalline with N-plus doped electrodes. It should be recognized that variations of sensor shape will immediately become apparent to those skilled in the art. It is therefore the intention that the appended claims be interpreted as broadly as possible to include all such variations and modifications, for example, the triangular shape of a sensor or a sensor with two chamfered corners. In addition, different number of depth segments and different variation in segment lengths are covered by the present claimed invention.

REFERENCES

R. Nowotny "Application of Si-microstrip-detectors in medicine and structural analysis" Nuclear Instruments and Methods in Physics Research 226 (1984) 34-39

U.S. Pat. No. 4,937,453 Robert Nelson "X-ray detector for radiographic imaging"

U.S. Pat. No. 5,434,417 David Nygren "High resolution energy-sensitive digital X-ray"

U.S. Pat. No. 7,291,841 B2 Robert Nelson et al. "Device and system for enhanced SPECT, PET, and Compton scatter imaging in nuclear medicine"

Shoichi Yoshida, Takashi Ohsugi "Application of silicon strip detectors to X-ray computed tomography" Nuclear Instruments and Methods in Physics Research A 541 (2005) 412-420

U.S. Pat. No. 8,183,535 B2 Mats Danielsson et al. "Silicon detector assembly for x-ray imaging"

Cheng Xu et al. "Energy resolution of a segmented silicon strip detector for photon-counting spectral CT" Nuclear Instruments and Methods in Physics Research A 715 (2013)11-17

Xuejin Liu et al. "Spectral response model for a multibin photon-counting spectral computed tomography detector and its applications" Journal of Medical Imaging 2(3) (2015) 033502

Swedish Patent Application, No. 9801677-7, Mats Danielsson

"Charge collection in silicon strip detectors" Nuclear instruments and methods in physics research 214(2-3) (1983) 253-260

The invention claimed is:

1. An edge-on photon counting detector comprising a semi-conducting substrate comprising:
   a first end adapted to face an x-ray source and a second end opposite said first end in the direction of incoming x-rays;
   at least one strip having N depth segments, N≥2, each of said depth segments comprising a charge collecting metal electrode;
   a charge collecting side comprising doped regions and insulating regions;
   wherein each of said charge collecting metal electrodes is arranged over a corresponding doped region and is connected to a respective routing trace arranged on said insulating regions, said respective routing trace being adapted to conduct signals from the charge collecting metal electrode to a read-out pad, connectable to front-end electronics, arranged at said second end,
   wherein the number of strips is at least two, and
   wherein the width dimensions of the charge collecting metal electrodes are such that the ratio of the charge collecting metal electrode width to strip pitch is less than 0.8 in order to reduce capacitance.

2. The edge-on detector according to claim 1, wherein said semi-conducting substrate comprises silicon.

3. The edge-on detector according to claim 1, wherein said charge collecting metal electrodes and said routing traces are manufactured from the same metal.

4. The edge-on detector according to claim 3, wherein said charge collecting metal electrodes and said routing traces are provided in a single metal layer.

5. The edge-on detector according to claim 4, wherein said metal is aluminum.

6. The edge-on detector according to claim 1, wherein said insulating regions comprises regions of silicon dioxide.

7. The edge-on detector according to claim 1, wherein the number of strips is at least two and wherein the width dimension of the routing traces are such that the ratio of the routing trace width to strip pitch is less than 0.05 in order to reduce capacitance.

8. The edge-on detector according to claim 1, wherein the semi-conducting substrate is provided with doped regions in the area adjacent to the read-out pad arranged at said second end.

9. The edge-on detector according to claim 8, wherein said area adjacent to the read-out pad are further provided with insulating regions, whereby said doped regions and said insulating regions are arranged to form a pattern so that said routing traces run on the insulating regions to said read-out pad.

10. The edge-on detector according to claim 1, wherein said semi-conducting substrate have a tapered shape, whereby the first end of said semi-conducting substrate have a first width and the second end of said semi-conducting substrate have a second width, larger than said first width.

11. The edge-on detector according to claim 10, wherein said semi-conducting substrate comprises at least two strips of charge collecting metal electrodes, said strips being angled relative each other so that the charge collecting electrodes are provided on said charge collecting side in a tapered pattern following adapted to the tapered shape of said substrate.

12. The edge-on detector according to claim 1, wherein said second end of said substrate comprises at least one chamfered corner.

13. A method for manufacturing a charge collecting surface for an edge-on detector, wherein the method comprises:
providing (S1) a semi-conducting substrate, said semi-conducting substrate having a first end adapted to face an x-ray source and a second end opposite said first end;
providing (S2) a surface of said semi-conducting substrate, referred to as the charge collecting surface, with doped regions;
providing (S3) an insulating layer on the regions of said second surface that are not provided with doped regions;
arranging (S4) a read-out pad at said second end of said semi-conducting substrate;
depositing (S4) a single metal layer on top of said charge collecting surface comprising said doped regions and said insulating layer; and
patterning (S5) said single metal layer in order to:
i) form charge collecting metal electrodes on top of said doped regions, and;
ii) form routing traces on top of said insulating layer that connects said charge collecting metal electrode with said read-out pad.

14. The method according to claim 13, wherein the step (S4) of depositing a single metal layer comprises to use Physical Vapor Deposition (PVD), plating and/or Chemical Vapor Deposition (CVD).

15. The method according to claim 13, wherein the step (S5) of patterning said single metal layer comprises the use of photolithography.

16. The method according to claim 13, wherein the step (S1) of a semi-conducting substrate B comprises to provide a silicon substrate.

17. The method according to claim 13, wherein the step of depositing (S4) a single metal layer on top of said charge collecting surface comprises depositing a single aluminum layer.

18. The method according to claim 13, wherein the step of providing (S3) an insulating layer F on the regions of said second surface that are not provided with doped regions (R) comprises providing a silicon dioxide layer.

19. A method according to claim 13, wherein the step (S5) of patterning said metal layer comprises to form at least two strips of charge collecting electrodes, where each of the charge collecting electrodes have width dimensions such that the ratio of the charge collecting metal electrode width to strip pitch is less than 0.8.

20. A method according to claim 19, wherein the step (S5) of patterning said metal layer further comprises to form routing traces having width dimension such that the ratio of the routing trace width to strip pitch is less than 0.05.

21. An edge-on detector comprising a charge collecting surface manufactured according to claim 13.

* * * * *